(12) United States Patent
Bickford et al.

(10) Patent No.: US 7,487,477 B2
(45) Date of Patent: Feb. 3, 2009

(54) PARAMETRIC-BASED SEMICONDUCTOR DESIGN

(75) Inventors: Jeanne Paulette Spence Bickford, Essex Juntion, VT (US); John Robert Goss, South Burlington, VT (US); Nazmul Habib, South Burlington, VT (US); Robert J. McMahon, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 11/611,623

(22) Filed: Dec. 15, 2006

(65) Prior Publication Data
US 2008/0148197 A1    Jun. 19, 2008

(51) Int. Cl.
*G06F 17/50* (2006.01)
*G06F 19/00* (2006.01)

(52) U.S. Cl. ............................... 716/4; 716/18; 716/17; 703/16

(58) Field of Classification Search ............... 716/4, 716/18, 17; 703/16
See application file for complete search history.

(56) References Cited

U.S. PATENT DOCUMENTS

| 5,068,823 | A | 11/1991 | Robinson |  |
|---|---|---|---|---|
| 6,490,708 | B2 * | 12/2002 | Cohn et al. | 716/4 |
| 7,003,742 | B2 | 2/2006 | Saxena et al. |  |
| 7,243,320 | B2 * | 7/2007 | Chiu et al. | 716/4 |
| 2002/0133791 | A1 * | 9/2002 | Cohn et al. | 716/4 |
| 2004/0015793 | A1 | 1/2004 | Saxena et al. |  |
| 2005/0091629 | A1 * | 4/2005 | Eisenstadt et al. | 716/13 |
| 2006/0150129 | A1 * | 7/2006 | Chiu et al. | 716/4 |
| 2006/0190790 | A1 * | 8/2006 | Pilling et al. | 714/734 |
| 2006/0195726 | A1 * | 8/2006 | Ishizuka | 714/38 |
| 2007/0106967 | A1 * | 5/2007 | Inoue et al. | 716/4 |
| 2008/0133202 | A1 * | 6/2008 | Tseng et al. | 703/14 |

OTHER PUBLICATIONS

Abele et al., "Mixed-Signal Characterization Environments for Analog to Digital Converters", 48th Midwest Symposium on Circuits and Systems, vol. 2, Aug. 7-10, 2005, pp. 1147-1150.*
Bhardwaj et al., "A Framework for Statistical Timing Analysis Using Non-Linear Delay and Skew Models", IEEE/ACM International Conference on Computer-Aided Design, Nov. 2006, pp. 225-230.*

(Continued)

*Primary Examiner*—Phallaka Kik
(74) *Attorney, Agent, or Firm*—Wood, Herron & Evans LLP

(57) ABSTRACT

A parametric-based design methodology interlocks the design of library elements used in a semiconductor product design with the testing protocol used for the resulting semiconductor products such that parametric assumptions made regarding library elements used in a semiconductor product design may be used to disposition products such as semiconductor chips incorporating a semiconductor product design. In particular, a parametric measurement element is incorporated into a product design along with one or more library elements, with the parametric measurement element used to test one or more parametric design points that are associated with the library elements when the product design is used in a manufactured product.

9 Claims, 2 Drawing Sheets

OTHER PUBLICATIONS

Harish et al., "Modeling of the Effects of Process Variations on Circuit Delay at 65nm", 2005 IEEE Conference on Electron Devices and Solid-State Circuits, Dec. 19-21, 2005, pp. 761-764.*

Hu et al., "Fast-Yet-Accurate PVT Simulation by Combined Direct and Iterative Methods", IEEE/ACM International Conference on Computer-Aided Design, Nov. 6-10, 2005, pp. 495-501.*

Singh et al., "Statistical Technology Mapping for Parametric Yield", IEEE/ACM International Conference on Computer-Aided Design, Nov. 6-10, 2005, pp. 511-516.*

Zanella et al., "Modeling of Substrate Noise Injected by Digital Filters", 2001 International Symposium on Quality Electronic Design, Mar. 26-28, 2001, pp. 488-492.*

Cabbibo, A. et al., "Feed Forward Test Methodology Utilizing Device Identification", ITC International Test Conference, IEEE (Feb. 2004), Paper 23.1, 0-7803-8580-Feb. 2004, pp. 655-660.

Anand, Darren L., "A System for Acquiring Device Parameters", U.S. Appl. No. 11/459,367, filed Jul. 24, 2006.

* cited by examiner

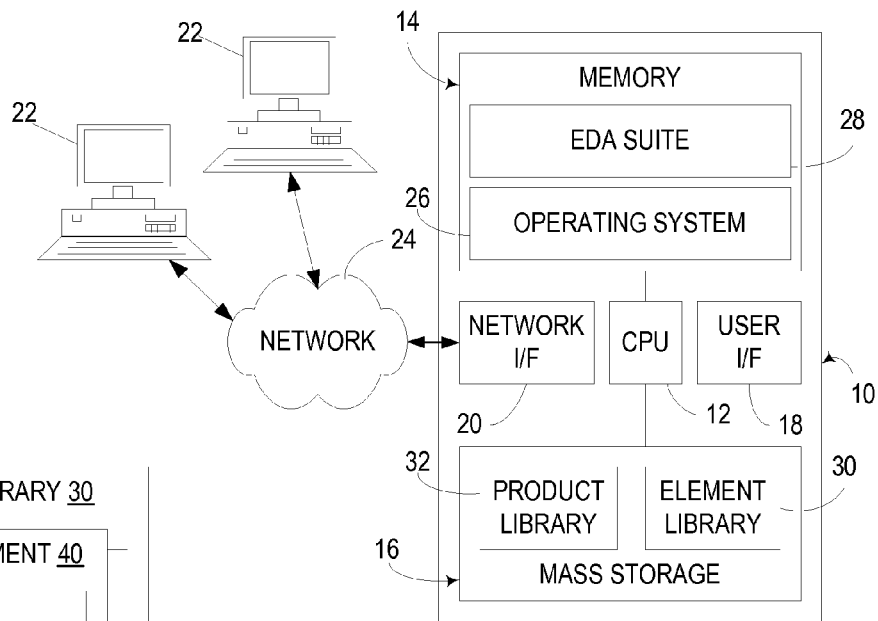

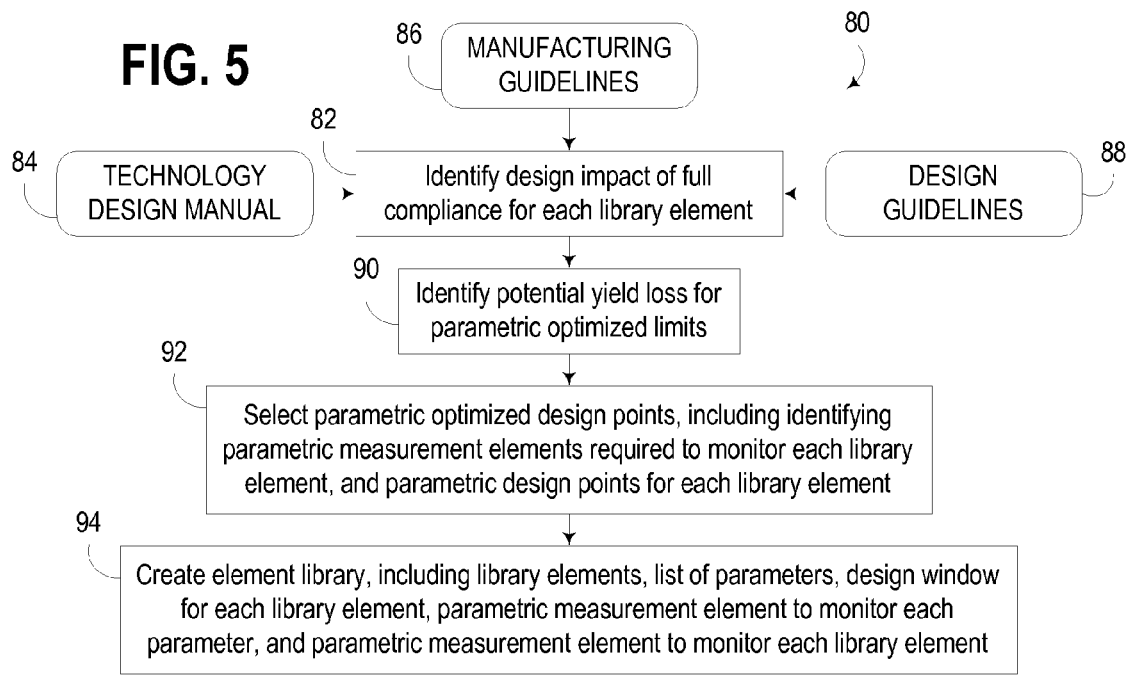
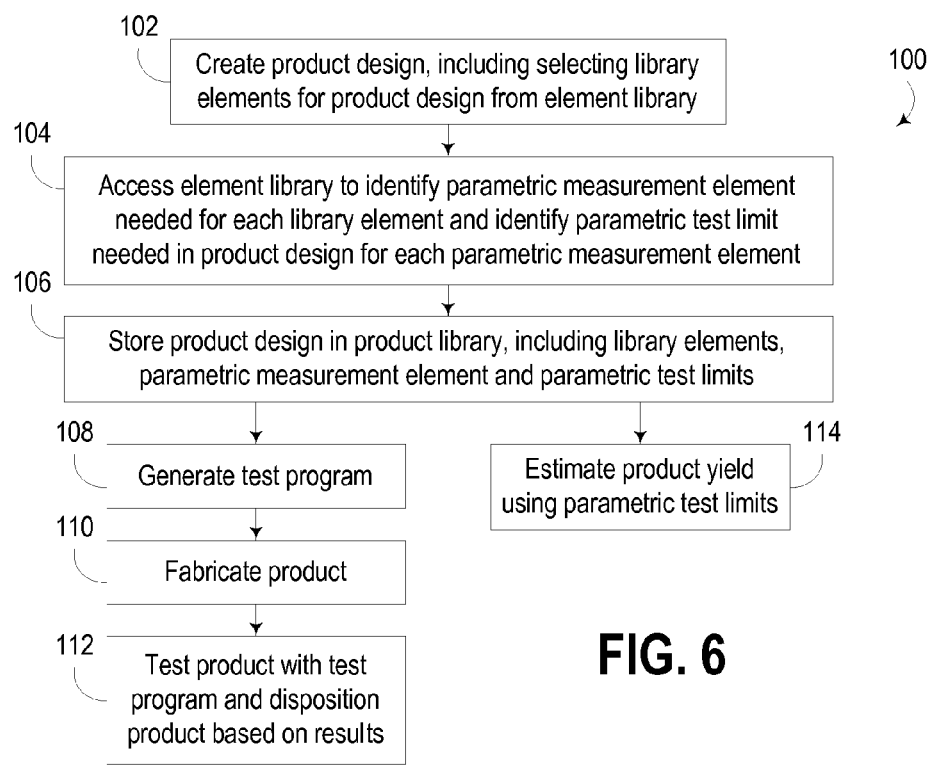

PARAMETRIC-BASED SEMICONDUCTOR DESIGN

FIELD OF THE INVENTION

The invention is generally directed to the design and fabrication of semiconductor products such as semiconductor integrated circuits or chips.

BACKGROUND OF THE INVENTION

Current semiconductor design practices often require extensive simulation of semiconductor designs, particularly analog-based designs, at or beyond 3 sigma. Scan-based, or other functional-based tests, which are typically the only types of tests that are used to disposition semiconductor products (i.e., determining whether products meet pass/fail criteria), typically do not identify parametric sensitivities for semiconductor designs, so in many cases not all functional process corners will be completely tested, which can increase the risk that defective products may be inadvertently shipped to customers. Parametric sensitivities relate, for example, to a number of different electrical or physical parameters (e.g., FET currents or threshold voltages, channel length, oxide thickness, resistance, capacitance) that can vary over a distribution as a result of variations in a fabrication process, and that can affect the likelihood that a particular manufactured semiconductor product will function correctly and within spec.

Conventionally, a large amount of resources are required to ensure that a semiconductor product design functions at the corners of parametric distributions (i.e., at the extremes of acceptable parametric distributions). However, there is typically a relatively low probability that a product will actually be manufactured near the corners of a distribution. As a result, semiconductor product designs are often designed overly conservatively, resulting in lost performance or excessively large designs just to account for the relatively low possibility that the resulting products will not meet spec. Otherwise, extended design and simulation time are required to ensure that a product design is fully functional at all possible parametric corners.

Therefore, a substantial need exists in the art for a manner or methodology for designing and testing semiconductor products that appropriately accounts for parametric sensitivities within a semiconductor product design and allows trade-off between yield loss and design optimization.

SUMMARY OF THE INVENTION

The invention addresses these and other problems associated with the prior art by utilizing a parametric-based design methodology that interlocks the design of library elements used in a semiconductor product design with the testing protocol used for the resulting semiconductor products such that parametric assumptions made regarding library elements used in a semiconductor product design may be used to disposition products such as semiconductor chips incorporating a semiconductor product design. In particular, a parametric measurement element is incorporated into a product design along with one or more library elements, with the parametric measurement element used to test one or more parametric design points that are associated with the library elements when the product design is used in a manufactured product.

Consistent with one aspect of the invention, a semiconductor product may be designed by generating a design for the semiconductor product that includes a plurality of library elements selected from a library, where each library element among the plurality of library elements is associated in the library with a plurality of parametric design points to which such library element is designed. The library is accessed to retrieve the parametric design points associated with each library element included in the semiconductor product design, and a parametric measurement element, suitable for use in testing the retrieved parametric design points for the library elements included in the semiconductor product design, is generated based upon the retrieved parametric design points. The generated parametric measurement element is incorporated in the semiconductor product design, and, based upon the retrieved parametric design points, a plurality of parametric test limits to be used in testing a semiconductor die incorporating the semiconductor product design are generated. The parametric test limits are associated with the tightest parametric design points among those associated with the library elements included in the semiconductor product design.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of a computer suitable for use in parametric-based design consistent with the invention.

FIG. 2 is a block diagram of the element library referenced in FIG. 1.

FIG. 3 is a block diagram of the product library referenced in FIG. 1.

FIG. 4 is a block diagram of an exemplary parametric measurement element suitable for incorporation into a product design in the product library of FIG. 3.

FIG. 5 is a flowchart illustrating the steps in an exemplary process for creating the element library of FIG. 2.

FIG. 6 is a flowchart illustrating the steps in an exemplary process for designing, fabricating and testing a semiconductor product using library elements from the element library of FIG. 3.

DETAILED DESCRIPTION

The embodiments described hereinafter provide a means for trading off design optimization resource and yield, while still ensuring that all shipped product meets designated parametric requirements. A parametric measurement element disposed on a semiconductor product such as a semiconductor chip is used to determine parametric values, with the parametric values used for disposition of the product. The parametric values are effectively interlocked with design assumptions, with library elements incorporated into a product design specifically associated with parametric design points for one or more parameters, such that the parametric design points can be used to test and disposition/sort actual product incorporating such library elements based upon designated parametric requirements.

A parametric design point is typically associated with an electrical or physical parameter that is indicative of the likely performance of the components on a semiconductor chip, e.g., FET currents or threshold voltages, channel length, oxide thickness, resistance, capacitance, etc., including, for example, various parameters that may be used in connection with monitoring the health of a fabrication process. Parametric design points typically identify distributions for a parameter, e.g., as expressed in a number of sigma points (standard deviations) from a mean value, and thus define the allowable variance that may be seen in a parameter in a product.

By associating parametric design points with library elements often less up front design time is required to account for all possible process variations, and less time is often involved in connection with the characterization and/or qualification of designs. Product may be sorted to device parameters to weed out problem parts, avoiding the need for an iterative feedback process to update performance tests to guardband against process outliers.

Product designs can typically be created assuming any technology design manual rule distribution as long as the assumptions used at the time of design are used to test the parametric measurement element in the corresponding products, often enabling product designs that will be used in limited applications to be safely designed to different criteria than product designs that will be used for many products. Furthermore, use of the parametric measurement element typically ensures that parts of a distribution that could create a functional fail are never shipped to customers.

Turning now to the Drawings, wherein like numbers denote like parts throughout the several views, FIG. 1 illustrates an exemplary hardware and software environment for an apparatus 10 suitable for use in connection with parametric-based design in a manner consistent with the invention. For the purposes of the invention, apparatus 10 may represent practically any type of computer, computer system or other programmable electronic device, and may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, along with several different types of peripheral devices, e.g., a mass storage device 16, a user interface 18 (including, for example, user input devices and a display), and a network interface 20 (for use in communicating with one or more other computers 22 over a network 24).

Computer 10 operates under the control of an operating system 26, and executes or otherwise relies upon various computer software applications, components, programs, objects, modules, data structures, etc., including, for example, an Electronic Design Automation (EDA) suite 28 for use in designing, testing, simulating, and otherwise creating designs for semiconductor products such as semiconductor chips and the like. Moreover, various applications, components, programs, objects, modules, etc. may also execute on one or more processors in another computer coupled to computer 10 via a network, e.g., in a distributed or client-server computing environment.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

As further illustrated in FIG. 1, the herein described embodiment utilizes an element library 30 and a product library 32. Each library may be implemented within a database, and in some implementations, both libraries may be implemented within the same library or database. Furthermore, in some embodiments, different types of data within each library 30, 32 may be stored within separate libraries or databases. For example, in some embodiments, the actual library element designs and/or product designs may be stored in separate libraries or databases than the parametric design points, parametric test limits and/or parametric measurement elements.

FIG. 2 illustrates element library 30 in greater detail. Library 30 typically includes a plurality of library elements 40, and stored with or otherwise associated with each library element 40 is a design layout 42 for the library element, e.g., the physical design files, as well as one or more parametric design points 44 associated with the library element.

Library 30 may also include one or more parametric measurement elements 46, capable of being used to create a product-specific parametric measurement element that is capable of testing all of the relevant parameters for a particular product incorporating one or more library elements. Each parametric measurement element 46 may represent a complete element that is capable of testing a unique set of parameters, or in the alternative, a parametric measurement element may be constructed from a unique set of modules or building blocks that are configured to test specific parameters, with selected modules or building blocks assembled with other core logic to create a product-specific parametric measurement element.

FIG. 3 illustrates product library 32 in greater detail. Library 32 typically includes a plurality of product designs 50, each including a design layout 52 that typically incorporates a plurality of library elements 40 from element library 30, along with a product-specific parametric measurement element 54 selected from, or created from, the parametric measurement elements 46 from element library 30. The design layout 52 typically also includes additional circuit logic such as custom logic or the glue logic that interconnects the library elements incorporated into the product design. Of note, the parametric measurement element 54 is disposed within the product design, and as such will be incorporated directly into the semiconductor product itself, e.g., on the same semiconductor die or chip, such that element 54 may be used to measure one or more parameters for each fabricated product. Each product design 50 also includes a set of parametric test parameters 56 associated with the product design. The test parameters are generated based upon the parametric design points for all of the library elements used in the product design, and are used by a test program to subject fabricated products to product-specific parametric tests.

As noted above, a number of different parametric measurement element implementations may be used consistent with the invention. One such implementation, referred to herein as a scalable parametric macro 60, is illustrated in greater detail in FIG. 4. Macro 60 is further described in U.S. patent application Ser. No. 11/459,367, filed on Jul. 24, 2006 by Anand et al. and assigned to the same assignee as the present invention, the disclosure of which is incorporated by reference herein. The basic architecture of macro 60 includes a plurality of test circuits, or Device Under Test (DUT) circuits 62, coupled to a control logic block 64 and a power supply connection block 66. Each DUT 62 is configured to test one or more parameters, e.g., similar to a kerf circuit. Control logic 64 is used to activate individual DUT's 62 during testing, and power supply connection block 66 is used to supply power to DUT's 62 to perform different types of tests. It will be appreciated that other parametric measurement elements that may be disposed on a semiconductor product and used to test one or more electrical and/or physical parameters associated with the semiconductor product, may be used consistent with the invention.

To implement parametric-based design consistent with the invention, an element library is created including one or more parameter optimized library elements. Thereafter, a product is designed to incorporate one or more library elements from the element library such that when the product is fabricated and tested, a custom parametric test may be applied against the product to disposition the product. FIG. 5 is a flowchart illustrating the steps in an exemplary process 80 for creating an element library in a manner consistent with the invention.

Process 80 begins in block 82, where a developer (optionally with the assistance of a software tool) identifies the design impact of full compliance for each library element. As a part of this step, the developer typically identifies the design impact on performance, function, turn around time, area, etc. In connection with this operation, the developer may consult guidelines, e.g., as provided in a technology design manual 84, within manufacturing guidelines 86 associated with a particular fab line, and/or within design guidelines 88 established for meeting functional specifications.

Next, in block 90, the developer (again optionally with the assistance of a software tool) identifies the potential yield loss associated with customized parametric design points that may be selected for a library element. Next, in block 92, the developer (again optionally with the assistance of a software tool) selects parametric optimized design points or limits for each desired library element. As a part of this step, the developer also determines the parametric measurement elements (or the modules or circuits that may need to be incorporated into a parametric measurement element) that will be required to monitor each library element, as well as the parametric design points that will be established for each library element. The parametric design points are typically selected to minimize yield loss while maximizing performance, turn around time, function, area, etc., thus balancing any competing concerns.

Next, in block 94, the element library is created, including the desired library elements, a list of relevant parameters, a design window (i.e., a set of parametric design points) for each library element, the parametric measurement element required to monitor each parameter, and the parametric measurement element to monitor each library element. This information may be stored, for example, in the element library in the format illustrated in FIG. 2. The creation of the library elements and/or the parametric measurement elements may incorporate the generation of suitable design layouts for such elements, and may include the adaptation of existing elements based upon the desired design window. It will be appreciated that, rather than creating an element library from scratch, block 94 may simply add one or more library elements and/or parametric measurement elements (along with the associated parametric data) to an existing library. In addition, block 94 may result in the generation of multiple library elements that are functionally the same, but that are designed to different design windows. As such, at the conclusion of block 94, an element library is created where library elements, optimized for a particular set of parametric design points, are stored in the library and associated both with the parametric design points with which they are associated and the parametric measurement elements (or modules therefor) that will be needed to test such library elements when used in a product.

FIG. 6 next illustrates the steps in an exemplary process 100 for designing, fabricating and testing a semiconductor product using library elements from an element library in a manner consistent with the invention. Process 100 begins in block 102 by creating a product design using one or more library elements from the element library, typically under the direction of a developer operating a software tool. Step 102 may also necessitate that a developer incorporate custom logic such as glue logic in the design layout for the product design to interconnect the library elements or otherwise generate a custom product design.

Next, in block 104, the element library is accessed to identify the parametric measurement element needed for each library element and to identify the parametric test limit needed in the product design for each parametric measurement element. The parametric measurement element may be selected from a set of available elements, or in the alternative, modules, e.g., DUT's, suitable for testing all of the required parameters, may be identified and used to build a custom parametric measurement element. Also, in the illustrated embodiment, the parametric test limit for a particular parameter is set to the tightest parametric design point for that parameter among all of the library elements used in the product design. As such, if, for example, three library elements have design points for a parameter such as threshold voltage of 2.5 Sigma, 3 Sigma, and 5 Sigma, a parametric test limit of 2.5 Sigma will typically be used for threshold voltage.

Next, in block 106, the product design is stored in the product library, including within the product design the library elements, parametric measurement element and parametric test limits to be associated with the product design.

Once the product design has been developed and stored in the product library, the product design may be used to manufacture product. For example, the product design may be used to build a custom test program for the product as illustrated in block 108. The custom test program is configured to test all of the necessary parameters for the product design against the parametric test limits associated with the product design.

Once the test program is completed, the product may be fabricated as shown in block 110, and thereafter, at some stage of the fabrication process (e.g., in-line, wafer, module, or packaging), the product is tested (block 112) using the parametric measurement element disposed on the manufactured product, and using the test program associated with the product design. Based upon this test, the product is dispositioned/sorted (i.e., shipped or passed along to the next stage of the manufacturing process, or discarded/scrapped), such that products that do not pass the test will be rejected.

The parametric test limits and/or parametric test data generated by a parametric measurement element may be used for other purposes consistent with the invention. For example, as illustrated in block 114, the parametric test limits for a product may be used to estimate a product yield, which then may be used to either alter the design of the product and/or the library elements, or to identify potential areas in the process suitable for improvement.

Among other benefits, embodiments consistent with the invention effectively balance design optimization, design cost, and cost of manufacturing yield loss, in many instances avoiding design sub-optimization (performance or size) for unlikely manufacturing events and/or extended design times for manufacturing events. Embodiments consistent with the invention may also reduce the cost of functional testing, and may eliminate the need to test for corners that will be removed as a result of using parametric measurement elements. Embodiments consistent with the invention may also avoid the shipment of non-conforming parametric products without the added cost of many functional tests.

It will be appreciated that the implementation of a number of the operations described above in connection with FIGS. 5 and 6 into program code utilized in an EDA-based tool or other computer program would be well within the abilities of one of ordinary skill in the art having the benefit of the instant disclosure. In addition, various modifications may be made to the illustrated embodiments without departing from the spirit and scope of the invention. Therefore, the invention lies in the claims hereinafter appended.

What is claimed is:

1. A method of designing a semiconductor product, the method comprising:
    generating a design for the semiconductor product that includes a plurality of library elements selected from a library, wherein each library element among the plurality of library elements is associated in the library with a plurality of parametric design points to which such library element is designed;
    accessing the library to retrieve the parametric design points associated with each library element included in the semiconductor product design;
    generating based upon the retrieved parametric design points a parametric measurement element suitable for use in testing the retrieved parametric design points for the library elements included in the semiconductor product design;
    incorporating the generated parametric measurement element in the semiconductor product design; and
    generating based upon the retrieved parametric design points a plurality of parametric test limits to be used in testing a semiconductor die incorporating the semiconductor product design, wherein the parametric test limits are associated with tightest parametric design points among those associated with the library elements included in the semiconductor product design.

2. The method of claim 1, further comprising designing a first library element among the plurality of library elements included in the semiconductor product design, including:
    selecting a plurality of parametric design points for the first library element, wherein each parametric design point is selected to balance yield with at least one of performance, function and area;
    designing the first library element to the selected parametric design points; and
    storing the first library element in the library along with the selected parametric design points.

3. The method of claim 1, wherein generating the parametric test limits includes generating a parametric test limit for a first parameter by selecting a tightest parametric design point among a plurality of parametric design points associated with at least a subset of the library elements included in the semiconductor product design.

4. The method of claim 1, wherein generating the parametric measurement element includes including within the parametric measurement element a plurality of test circuits and a control circuit configured to select from among the plurality of test circuits during testing of a semiconductor chip incorporating the semiconductor product design, wherein each test circuit is configured to test at least one parameter among a plurality of parameters associated with the retrieved parametric design points.

5. The method of claim 1, further comprising:
    fabricating a semiconductor wafer with at least one semiconductor chip disposed thereon that is based upon the semiconductor product design;
    accessing the parametric measurement element in the semiconductor chip after fabricating the semiconductor wafer to obtain a plurality of parametric measurements for the semiconductor chip; and
    dispositioning the semiconductor chip by testing the plurality of parametric measurements against the generated parametric test limits for the semiconductor product design.

6. An apparatus, comprising:
    a library including a plurality of library elements suitable for use in a design for a semiconductor product, wherein each library element is associated in the library with a plurality of parametric design points to which such library element is designed;
    at least one processor; and
    program code configured to be executed by the at least one processor to generate a design for a semiconductor product that includes at least a subset of the plurality of library elements in the library, access the library to retrieve the parametric design points associated with each library element included in the semiconductor product design, generate based upon the retrieved parametric design points a parametric measurement element suitable for use in testing the retrieved parametric design points for the library elements included in the semiconductor product design, incorporate the generated parametric measurement element in the semiconductor product design, and generate based upon the retrieved parametric design points a plurality of parametric test limits to be used in testing a semiconductor die incorporating the semiconductor product design, wherein the parametric test limits are associated with tightest parametric design points among those associated with the library elements included in the semiconductor product design.

7. The apparatus of claim 6, wherein the program code is further configured to store a first library element among the plurality of library elements included in the semiconductor product design in the library, wherein the first library element is designed to a plurality of parametric design points that are selected to balance yield with at least one of performance, function and area, and wherein the program code is further configured to associate the selected parametric design points with the first library element in the library.

8. The apparatus of claim 6, wherein the program code is configured to generate the parametric test limit for a first parameter by selecting a tightest parametric design point among a plurality of parametric design points associated with at least a subset of the library elements included in the semiconductor product design.

9. The apparatus of claim 6, wherein the program code is configured to generate the parametric measurement element by including within the parametric measurement element a plurality of test circuits and a control circuit configured to select from among the plurality of test circuits during testing of a semiconductor chip incorporating the semiconductor product design, wherein each test circuit is configured to test at least one parameter among a plurality of parameters associated with the retrieved parametric design points.

* * * * *